(12) United States Patent
Burke

(10) Patent No.: US 7,758,219 B2
(45) Date of Patent: Jul. 20, 2010

(54) LIGHT COUPLED DETACHABLE STERN ANCHOR AND NAVIGATION LIGHT FOR BOATS

(76) Inventor: John Burke, 7101 Seabury Ct, Tampa, FL (US) 33615

(*) Notice: Subject to any disclaimer, the term of this patent is extended or adjusted under 35 U.S.C. 154(b) by 163 days.

(21) Appl. No.: 12/174,120

(22) Filed: Jul. 16, 2008

(65) Prior Publication Data

US 2009/0021954 A1 Jan. 22, 2009

Related U.S. Application Data

(60) Provisional application No. 60/950,650, filed on Jul. 19, 2007.

(51) Int. Cl.
*F21V 1/00* (2006.01)

(52) U.S. Cl. ....................... 362/477; 362/551

(58) Field of Classification Search .................. 362/551, 362/477, 641, 652, 508, 581; 385/31, 39
See application file for complete search history.

(56) References Cited

U.S. PATENT DOCUMENTS

| | | | |
|---|---|---|---|
| 4,389,085 A | 6/1983 | Mori | |
| 4,740,870 A | 4/1988 | Moore | |
| 5,161,874 A | 11/1992 | Benes | |
| 5,339,225 A | 8/1994 | Wiggerman | |
| 5,477,424 A * | 12/1995 | Mocha | 362/555 |
| 6,155,195 A | 12/2000 | Nirenberg | |
| 6,272,267 B1 * | 8/2001 | Hansler et al. | 385/43 |
| 6,742,916 B1 | 6/2004 | Dunn | |
| 2007/0274635 A1 * | 11/2007 | Oney | 385/39 |

* cited by examiner

*Primary Examiner*—Ali Alavi

(57) ABSTRACT

An apparatus and method that improves the usable life and reliability of detachable stern lights for boats. It replaces electrical energy coupling by light energy coupling, thereby eliminating electrical contact corrosion problems.

10 Claims, 3 Drawing Sheets

LIGHT COUPLED DETACHABLE STERN ANCHOR AND NAVIGATION LIGHT FOR BOATS

CROSS-REFERENCE TO RELATED APPLICATIONS

This application claims priority of provisional application 60/950,650 filed on 19 Jul. 2007

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to boat stern lights for anchor and navigational purposes. Specifically, to detachable (stowable) stern lights, which allow the light to be stored out of the way, an advantage for many daytime activities and boat storage.

2. Background

Detachable (sometimes called stowable) stern lights typically consist of a base which is mounted to the boat structure and a pole which mechanically couples to the base. The pole has a light emitting device (typically an incandescent bulb) at the distal end. Power to energize the bulb is coupled via electrical contacts at the base and the proximal end of the pole.

Electrical contacts are composed primarily of copper and copper alloys. Although weather covers are typically provided to cover the base electrical contacts, water intrusion almost always occurs. Copper electrical contacts exposed to moisture leads to corrosion and eventual electrical failure of the contacts. The problem is particularly acute in marine environments.

Several US Patents describe prior art systems which are related but differ from the invention.

U.S. Pat. No. 4,389,085 to Mori describes a fiber optic system which collects and distributes sunlight.

U.S. Pat. No. 4,740,870 to Moore discloses a central light source which is transmitted to different areas of a boat via fiber optic cabling.

U.S. Pat. No. 5,161,874 to Benes describes a remote illumination system that utilizes a single light source and a light pipe to transmit the light to some remote locations from the source.

U.S. Pat. No. 5,339,225 to Wiggerman is a boat stern light design that illuminates the length of the pole, as opposed to just having a light at the distal end.

U.S. Pat. No. 6,155,195 to Nirenberg discloses a telescoping stern light that can be retracted out of the way when not in use.

U.S. Pat. No. 6,742,916 B1 to Dunn describes a fiber optic cabling system for the sides of boats which is intended illuminate said side for safety or enjoyment purposes.

SUMMARY OF THE INVENTION

Previous detachable stern light designs utilize electrical contacts between the base and detachable pole. The contacts connect the electrical power present in the base component to wires within the pole, which in turn transmit the electrical power to a distal end mounted light bulb.

The invention eliminates the electrical contacts corrosion problem of previous designs by transmitting light instead of electrical current across the coupling of the base and light conduit. It further replaces the combined pole and light bulb assembly into a single light conduit.

In the broadest form, the invention consists of a boat, a base mounted to the boat or boat component, a external electrical power connection, a electrical power conditioning device (light driver device), a light source, a detachable light conduit that mounts to the base, and a mechanism to redirect and emit the transmitted light out of the light conduit.

The boat is any vessel that is required to have or desires to have a detachable stern light.

The base is essentially a boat mounted socket for the pole. The socket provides mechanical mounting and light coupling between the base and light conduit. In various embodiments, the base may have the light source incorporated into it or the light source may be externally mounted to it. The base may be mounted to any boat structure or outboard motor component which allows the stern light to be visible as required or desired.

The light source may be formed by a multitude of visible light emitting devices, in one embodiment being a high intensity LED or LEDs.

The electrical power may be from any suitable source which can energize the light source. In one embodiment, the source is the boat's electrical power system.

The light driver device circuit can consists of any device capable of converting the incoming electrical power to a form required by the light source. Examples of such devices range from a simple power resistor to switching power topology circuits.

The light conduit may also take a multitude of embodiments, one being an acrylic rod. A key characteristic of the light conduit is the efficient conduction of light. The diameter and length of the light conduit is determined by the application. The rod may or may not have an external opaque covering.

The redirection mechanism for the light traveling within the light conduit may also take multiple forms. A fundamental characteristic of the mechanism is reflection of the conduit light to a direction which causes it to be emitted in essentially perpendicular (or nearly so) directions to the light conduit (pole). This emission may be in a 360 degree pattern or some lesser or subset(s) of 360 degrees around the boat.

In the following section, one embodiment of the invention is explained in detail. The invention is not intended to be limited in its application to the details of construction and to the arrangements of the components described in the following description or illustrated in the drawings. The invention is capable of other embodiments and of being practiced and carried out in various ways.

Also, the phraseology and terminology employed herein are for the purpose of description and should not be regarded as limiting.

It is the intention of the invention to provide a new detachable marine anchor and navigational stern light system which overcomes the disadvantages of previous systems which is not anticipated, rendered obvious, suggested, or even implied by any of the prior art boat light systems, either alone or in any combination.

BRIEF DESCRIPTION OF THE DRAWINGS

The following drawings illustrate the best modes presently contemplated for carrying out the present invention (Preferred Embodiment).

DESCRIPTION

Principle of Operation

The basic principle is that a light conduit couples the light source contained in the base to an apparatus at the top of the light conduit that disperses the light. Light, for the purposes of this invention, may consist of any wavelength or wavelengths in the visible spectrum.

Figure 1:
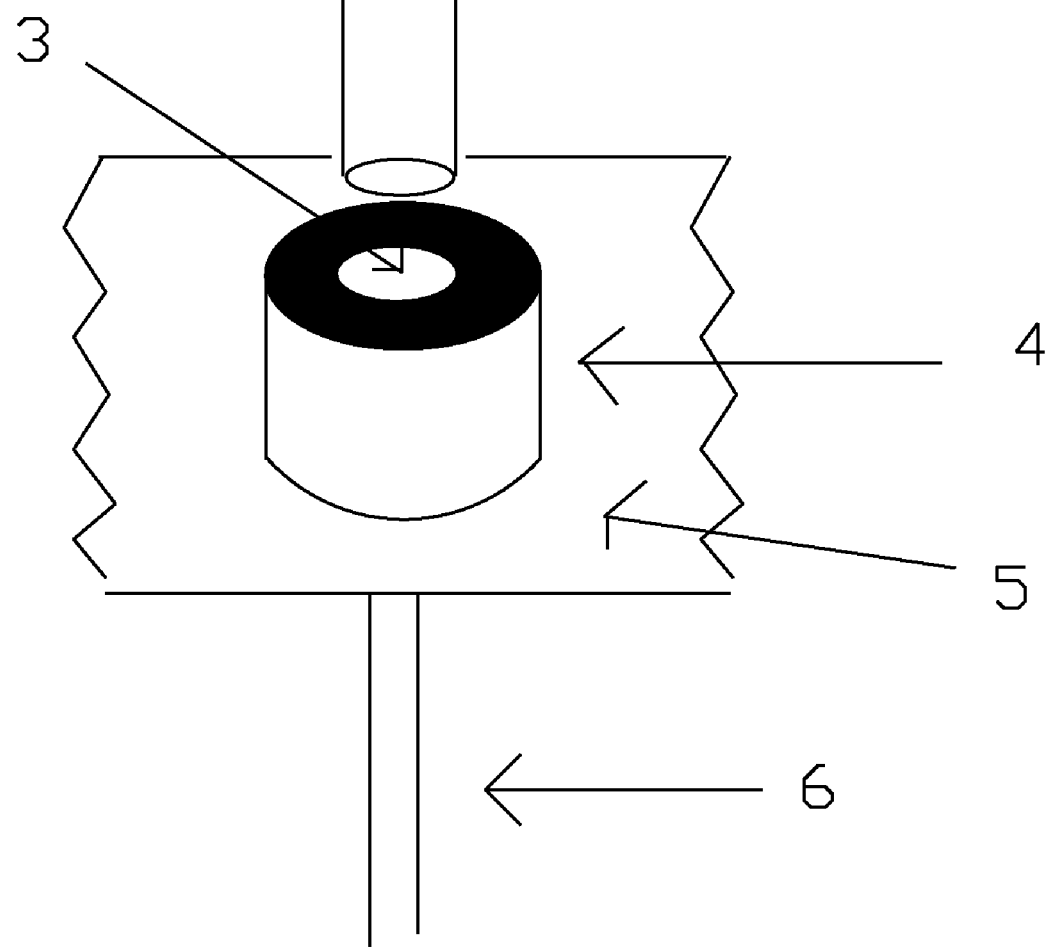
FIG. 1 Perspective component view of the invention and how they interface.
Figure 2:
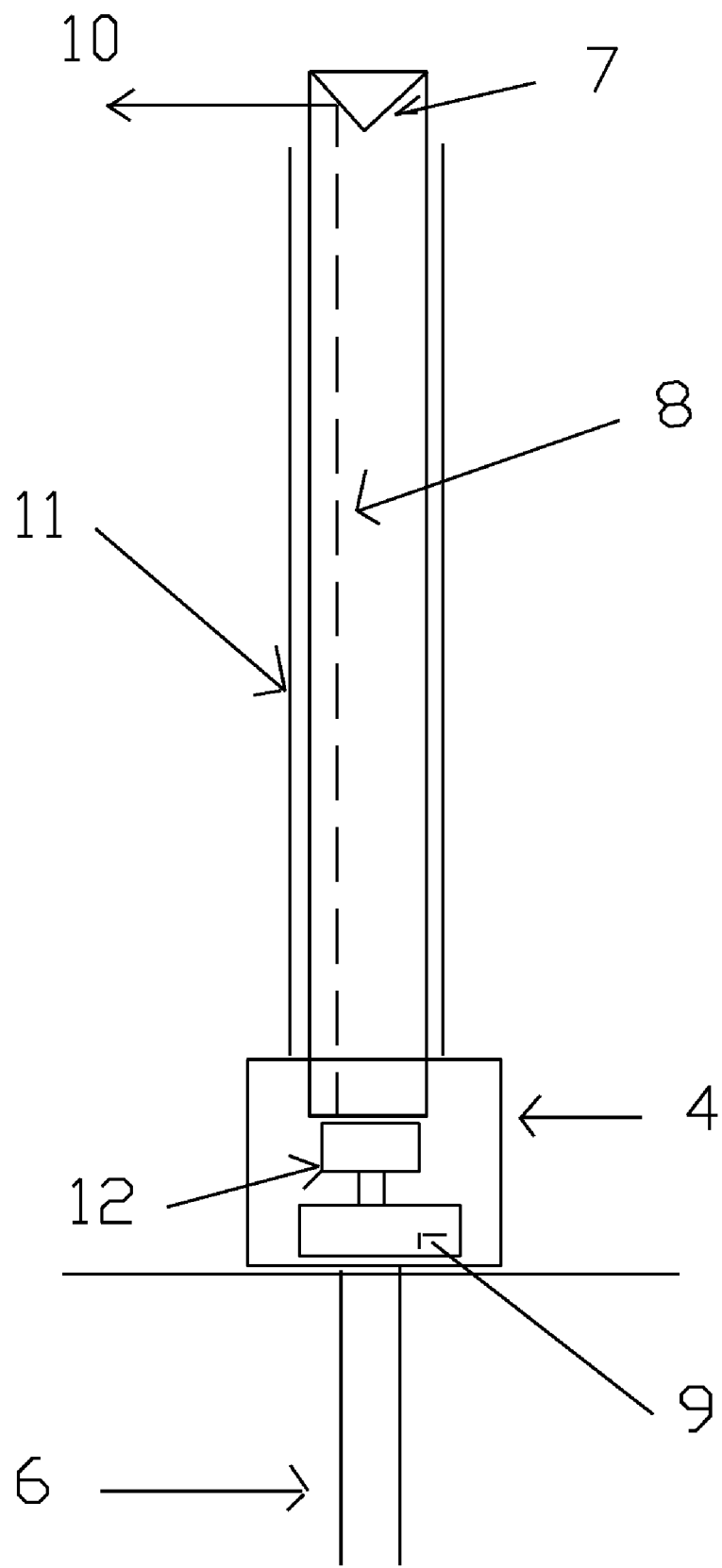
FIG. 2 Cross Section View of Invention with detail

Refer to FIGS. 1 and 2 for the following description.

The Components:

The preferred embodiment consists of two primary components: base 4 mounted to the boat structure or component or, on or within an outboard engine covering 5 and a light conduit 2 (shown detached), which plugs into the base light conduit socket 3.

The base contains a light source 12 and light source driver device 9. The light emitted from light source 12 is directed upward into the light conduit socket 3. The light source 12 is located at the bottom end of the light conduit socket 3 so as to minimize physical separation between the light source 12 and the installed light conduit 2.

The light conduit socket 3 diameter is such as to provide a slip fit to the light conduit 2, thus providing secure attachment of the light conduit 2, yet still allowing it to be easily removed.

Electrical wires 6 are provided on the lower side of the base 4 to connect to the boat electrical power system or separate electrical power source.

The base 4 may be constructed of any material suitable for the marine environment. Examples include aluminum, stainless steel and a variety of plastics and composites. This preferred embodiment utilizes aluminum.

The light conduit 2 construction comprises a rod, rods, a fiber or fibers which consist of any material or materials that efficiently conduct light with low loss. Examples of the materials include but are not limited to glass, polycarbonate and acrylic. The diameter is not critical and is primarily determined by the proximal end surface area needed to efficiently couple the light source 12 radiation pattern. Another diameter consideration is structural integrity, larger diameters being sturdier. The preferred embodiment uses a one half inch diameter acrylic rod for the light conduit 2.

The length of the light conduit 2 is likewise not critical, and can be varied to meet the height requirements of the application. The primary limitation on the length of the light conduit 2 is light intensity loss, however that can be offset by higher light source 12 intensity. The preferred embodiment uses a light conduit 2 length of thirty six inches. The dimensions chosen for the preferred embodiment of the light conduit 12 are not intended to be a limitation in any sense, since the length and diameter of the acrylic rod can be of nearly arbitrary dimensions, as needed by the application.

The distal end of the light conduit 2 has a light redirection device 7 to redirect the light traveling in the light conduit 2 outward in the desired light emission directional pattern.

In the preferred embodiment, the acrylic light conduit 2 has a cone 1 in the distal end to form a light redirection surface. The maximum diameter of the cone is sized so as to nearly match the diameter of the acrylic rod, tapering down to a point at the center of the acrylic rod. The cone 1 angle of the preferred embodiment is ninety degrees. However, the ninety degree angle is not intended to limit the possible angles in any way and any angle that redirects the light in the desired pattern is acceptable.

The light conduit 2 may have an optional outer covering 11. In the preferred embodiment an aluminum outer covering 11 is used to enhance light transmission and provide mechanical protection to the light conduit 2 acrylic rod. Other embodiments for the outer covering comprise aluminum, copper, steel, opaque plastics or opaque coatings.

The light conduit 2 may also have an optional light diffuser at its distal end. The diffuser may take the form of an external light diffusing covering external to the light conduit. Such diffusers are common on standard stern light designs.

Description of Operation

Electrical Section

The base 4, on its lower side, provides wires or terminals 6 for connection to the boat electrical power system. Alternatively, a battery or other electrical power source separate from the boat electrical system may be used. The base 4 contains the light source 12 that is directed upward inside the base socket so as to project light into the mating light conduit 2.

In the preferred embodiment, the light source 12 is a state-of-the-art high intensity LED available from multiple semiconductor manufacturers. The invention anticipates continuing advancements in LED technology which will provide more light output for less power consumption, hence improving overall efficiency and enabling longer light conduit 2 lengths for a given LED. Other possible light source 12 embodiments include incandescent, florescent, and LASER.

The light source 12 is driven by the light source driver device 9 which conditions the voltage presented via the electrical connection 6 to the drive requirements of the light source 12.

Figure 3:
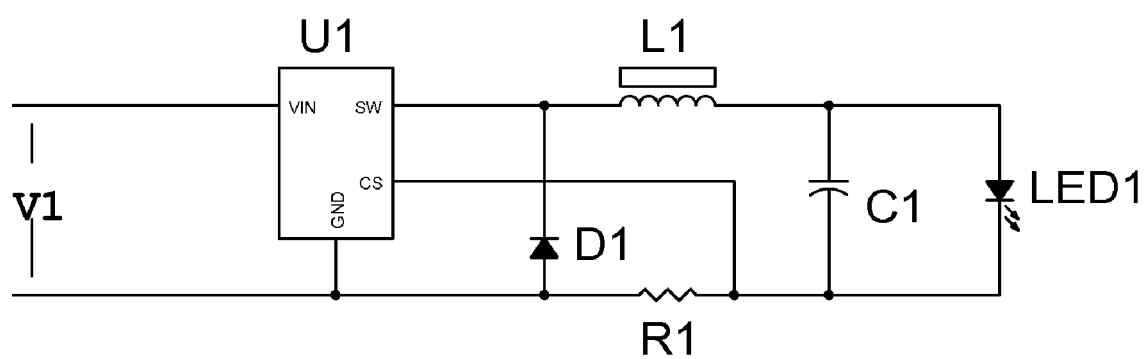
FIG. 3 Switching Power Supply Based Light Source Driver Device

In the preferred embodiment, the LED light source driver device 9 can take the form of a simple voltage dropping power resistor or a switching power supply design for lower power dissipation and more accurate LED current control. Multiple semiconductor manufactures provide LED driver circuits which are switching power supply topology based designs. Those skilled in the art will recognize the light driver circuit depicted in FIG. 3 as an example of a switching power supply based LED driver circuit. FIG. 3 depicts the classical elements: a voltage source V1, a power switch and PWM IC U1, an energy storage section formed by the inductor L1 and capacitor C1, a current sense resistor R1 and a current "catching" diode D1. The light source LED1 is the circuit "load". U1 has pins VIN—the voltage input, SW—power switch output, CS—current sense input and GND—circuit ground. For most applications the switching power supply design is preferred due to its low power dissipation and more accurate LED current control.

In the preferred embodiment, the LED light source 12 and the LED light source driver device 9 are epoxy encapsulated within the base to prevent water damage.

Optical Section

The light emerging from the light source 12 is optically coupled into the removable light conduit 2 installed into the base socket 3. The optical coupling is maximized by minimizing the air gap between the light source 12 and the proximal end of the light conduit 2.

The light coupled into the light conduit 2 experiences nearly total internal reflection, maximizing optical power transmission to the distal end. The phenomena of total internal reflection is well know to those skilled in the field of fiber optics and relies on the light conduit 2 (core) having a higher index of refraction than the surrounding outer covering 11 (cladding).

The light conduit 2 in this preferred embodiment is constructed from an acrylic rod which has excellent light transmission properties and is compatible with marine conditions. Other materials that have good light transmission properties and can be made to provide nearly total internal reflection are candidates for the light conduit 2 as well.

An optional outer covering 11 of the light conduit 2 further increases the internal reflection and blocks light from emerging along the periphery of the light conduit 2. The outer covering 11 must have an index of refraction lower than that of the light conduit 2 to minimize light loss. The outer covering 11 may also provide protection to the light conduit 2 from mechanical stress.

The distal end of the light conduit 2 has light redirection device 7. The light 8 traveling within the light conduit 2 is reflected by the redirection device 7 and is emitted 10 at angles largely perpendicular to the light conduit 2 Since light impinges essentially the entire reflective surface of the redirection device 7, the light is emitted in a three hundred sixty degree horizontal pattern around the distal end of the light conduit 2. The redirection can take place within the light conduit 2 or external to the light conduit. 2.

A light emission pattern of 360 degrees horizontal, a segmented pattern or a subset of 360 degrees horizontal pattern is possible by selectively blocking the light emission from the redirection device 7. The vertical light emission pattern is controlled largely by the angle of the redirection device 7 surface to the light 8 traveling in the light conduit 2.

The redirection device 7 may consist of any material or combinations of materials that efficiently redirect the light. In the case of internal redirection, the light traveling in the light conduit 2 encounters a redirection device 7 in the form of an optical discontinuity and reflects off said discontinuity. The light emission pattern is largely determined by the optical discontinuity's shape. In the case of external redirection (not shown), the light traveling in the light conduit 2 emerges from the distal end and continues on to encounters an external redirection device 7. Again, the shape of the redirection device 7 largely determines the light emission pattern.

In the preferred embodiment, the distal end of the acrylic light conduit 2 has a cone 1 shaped optical discontinuity at the distal end creating a redirection device 7. The light traveling within the light conduit 2 is redirected by the cone's reflective surface 1 and is emitted 10 at angles largely perpendicular to the light conduit 2. Since light impinges essentially the entire reflective surface of the cone 1, the light is emitted in a three hundred sixty degree horizontal pattern around the light conduit 2 distal end. The cone shape was chosen for its uniform light emission characteristic, however it is anticipated that other shapes for the redirection device 7 could be utilized, depending on the desired light emission pattern. The emitted horizontal light pattern can be reduced or segmented via opaque coverings over the sections of the redirection device 7 where light in not desired to be emitted.

The invention claimed is:

1. A stern light system for a boat, comprising:
a base mounted to or within a boat structure or component, an integral socket recessed into the base, said recessed socket directly coupling to a proximal end rod portion of the removable light conduit, said direct coupling comprising a slip-fit diameter of the recessed socket to the diameter of said rod, an enclosing of a proximal portion of said rod and a socket recess depth into the base such that a minimal gap is formed between the socket proximal end and the light source;
a connection to an electrical power source;
a combination driver device and light source, said combination enclosed within the base but external to the recessed socket of the base, the light driver device operably connected to the electrical power source and comprising voltage conversion, low power dissipation and accurate control of light source current, the light source operably connected to the light driver and abutting the proximal end of the base recessed socket with a minimal gap, the light source operable to project light across said minimal gap and into the light conduit rod proximal end, when said light conduit rod is installed in the recessed base socket
a removable light conduit, having the structure of a monolithic non-tapering cylindrical solid rod, the rod material comprising transparency and a higher refractive index than the surrounding media, a proximal end rod portion directly coupling with the recessed socket of the base, the direct coupling comprising a slip-fit diameter of the rod to the diameter of the recessed socket of the base, a proximal portion for enclosure by said socket and a light coupling surface area, the light coupling surface area consisting of the proximal end surface area of the rod, and a middle portion whose combination of structure and material make it operable to efficiently conduit and confine the conduit light to the distal end and maintain structural integrity at a length of at least forty eight inches;
and a mechanism to redirect and emit the light conducted within the light conduit rod out of the distal end in the in the desired emission pattern, said mechanism encompassed within the distal end structure, said structure a continuity of the non-tapering cylindrical rod of the light conduit, said mechanism a reflective surface near the distal end, said reflective surface having an angle-of-incidence to the conduit light operable to redirect and emit conduit light largely perpendicularly and a shape operable to emit light in the desired emission pattern around the distal end.

2. The stern light system described in claim 1, where the light driver device comprises a switching power supply topology based circuit.

3. The stern light system described in claim 1, wherein the light source is comprised of a Light Emitting Diode (LED) or LEDs.

4. The stern light system described in claim 1, wherein the light conduit has a cladding over the middle portion of the rod, said cladding refractive index operable to enhance the total internal reflection of the rod, said cladding material operable to protect the underlying rod from physical stress and damage.

5. The stern light system described in claim 1, wherein the shape of the reflector emits light in a 360 degree pattern around the distal end.

6. The light emission pattern described in claim 1, wherein the light emission pattern is comprised of selectively placing coverings opaque to light, light attenuating or combinations thereof over the areas where 100% light transmission is not desired.

7. The stern light system described in claim 1, wherein the base material is comprised of aluminum, stainless steel, plastics or combinations thereof.

8. The stern light system described in claim 1, wherein the light conduit material is comprised of acrylic, polycarbonate, glass or combinations thereof.

9. The stern light system described in claim 1, wherein the shape of the reflector emits light in a pattern of less than 360 degrees around the distal end.

10. The stern light system described in claim 1, wherein the shape of the reflector emits light in a segmented pattern around the distal end.

* * * * *